Figure 1:
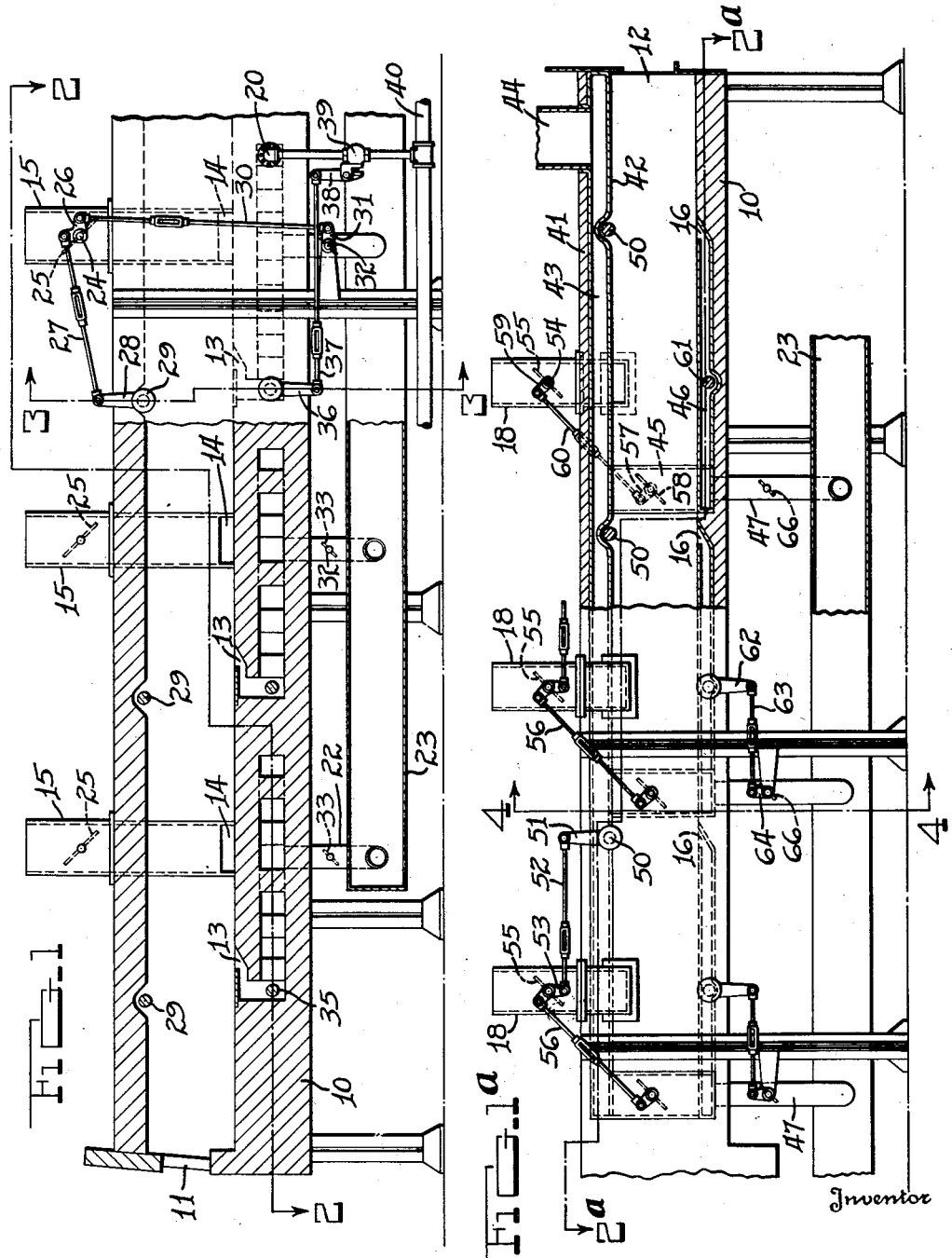

June 14, 1938. W. O. AMSLER 2,120,452
ANNEALING LEHR
Filed June 19, 1935 3 Sheets-Sheet 3
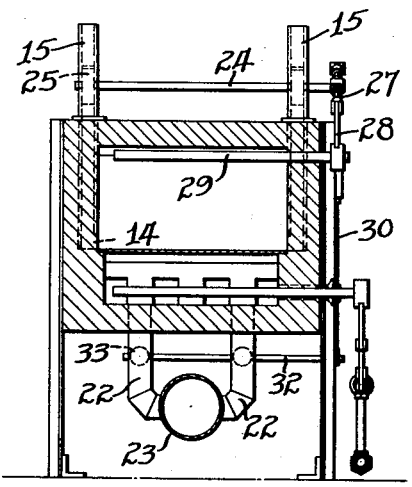
FIG. 3
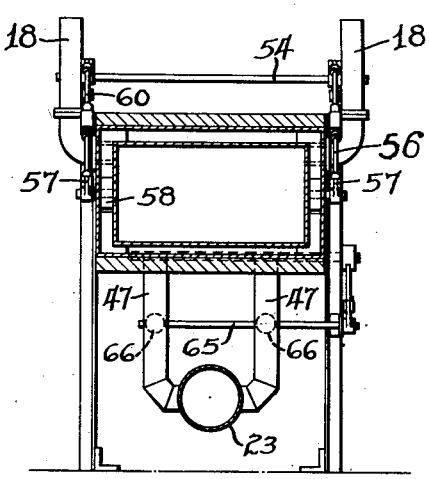
FIG. 4
FIG. 5
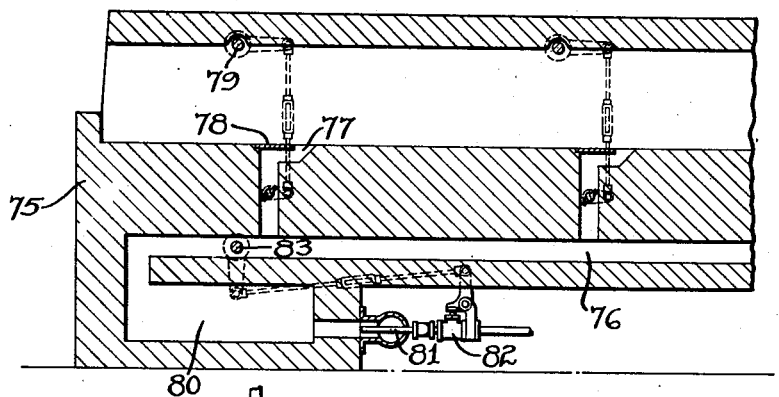
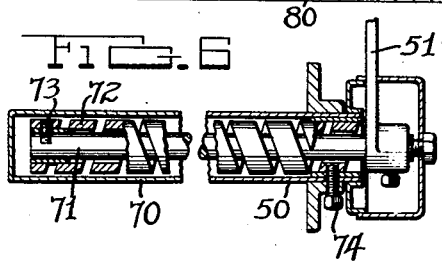
FIG. 6
Inventor
Walter O. Amsler
By Owen & Owen
Attorneys Patented June 14, 1938

2,120,452

UNITED STATES PATENT OFFICE 2,120,452

ANNEALING LEHR

Walter O. Amsler, Toledo, Ohio, assignor, by mesne assignments, to Frazier-Simplex, Inc., Washington, Pa., a corporation of Delaware Application June 19, 1935, Serial No. 27,293

8 Claims. (Cl. 49—47)

This application relates to an annealing lehr and a method of controlling the temperature of the same.

The object of the invention is to provide an annealing lehr which can be heated and cooled at appropriate portions so as to provide the desired temperature gradient in the lehr, the heating and cooling being done by gases which are at a temperature a predetermined amount above or below the temperature of the zone into which they are admitted, whereby too great difference between the temperature of the entering gases and that of the glassware contacted thereby is avoided.

It is well known that in the customary lehr for annealing glass, where the glass is progressed through a tunnel, it is desirable to heat the entrance end of the lehr to bring the glass to proper annealing temperature or, if the glass is introduced hot, to prevent unduly rapid cooling. On the other hand, it is desirable to hasten somewhat the cooling of the articles after the annealing has been completed and while the glass is being cooled down to proper temperature for removing from the lehr.

This invention consists essentially in maintaining successive zones of a tunnel lehr at predetermined temperatures, preferably by automatic means, and maintaining this temperature by controlling the rate of movement of gases into and from each zone, while maintaining the temperature of the entering gases at a predetermined differential from the temperature of the zone, substantially regardless of the rate of flow of the gases. By this means a heating zone may be maintained at a desired heating temperature by gases which are admitted in proper quantities to maintain the desired temperature and are preheated to a predetermined amount above the temperature maintained in this zone. In this way, however, rapidly or slowly the gases are admitted to maintain the proper temperature, there is never more than a predetermined maximum of difference between the temperature of the entering gases and the temperature of the zone.

Similarly in cooling zones gases may be admitted at a predetermined temperature cooler than the predetermined temperature of the zone and in such amounts as to maintain the desired temperature in the cooling zone.

Various arrangements may be made for accomplishing the essential purpose of this invention, but for purposes of illustration one embodiment of the invention is shown in the accompanying drawings, forming a part of this specification, and will be described in connection with those drawings.

Figure 2:
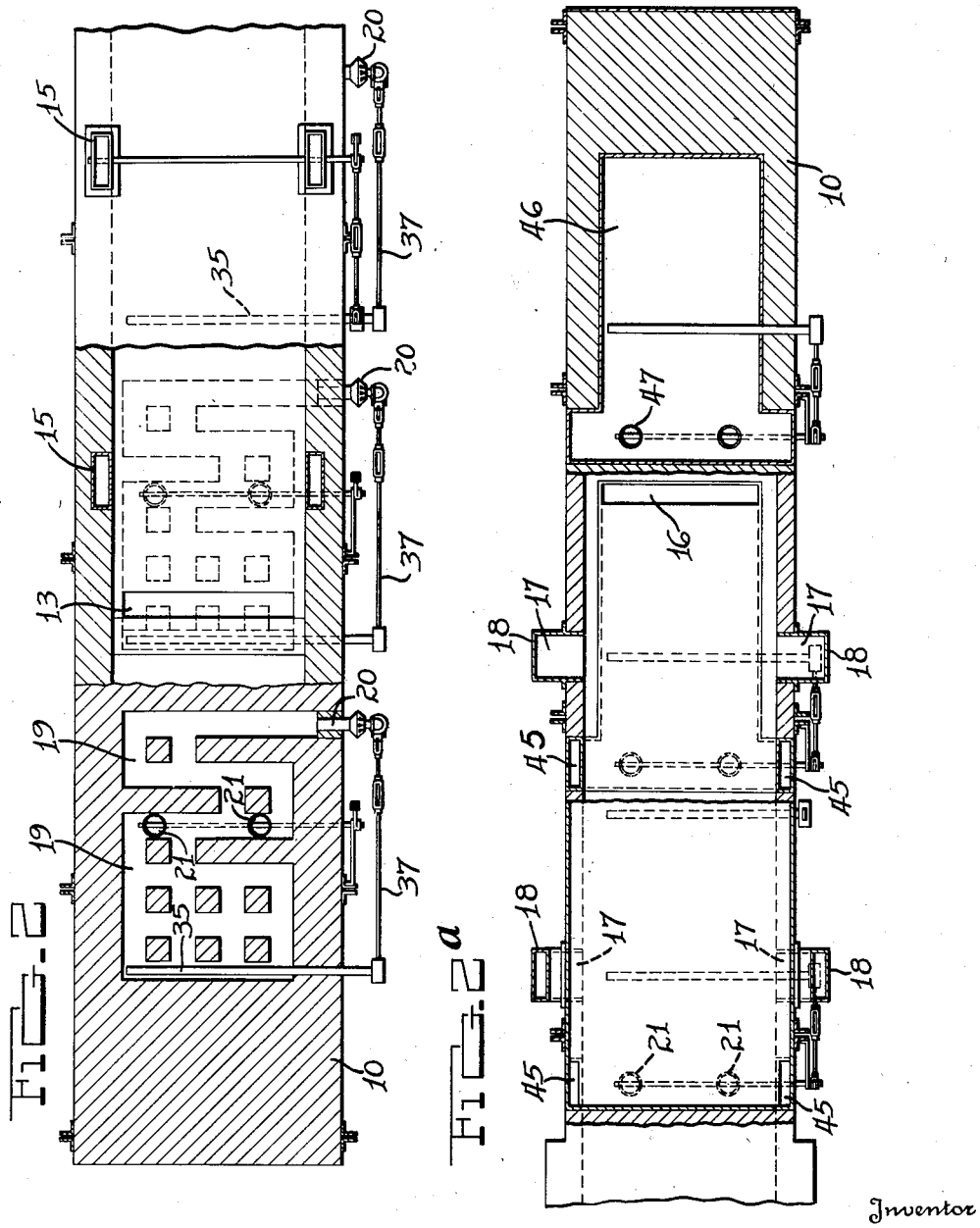

Figures 1 and 1a constitute a side elevation, partly in section, of one embodiment of the invention; Figs. 2 and 2a are sections along lines 2—2 and 2a—2a, respectively, of Figs. 1 and 1a; Figs. 3 and 4 are cross-sections on the line 3—3 of Fig. 1 and 4—4 of Fig. 1a; Fig. 5 is a section somewhat similar to Fig. 1 of a modified construction; and Fig. 6 is a detail view of a thermostatic controlling element.

In the construction shown in Figs. 1 to 4, there is a tunnel 10 having an inlet opening 11 and an outlet opening 12. In the heating end of the lehr there are inlet openings 13 and outlet openings 14 which discharge through stacks 15. In the cooling zone there are similar inlet openings 16 and outlet openings 17 which discharge through stacks 18.

The heating is accomplished by chambers 19 beneath the respective heating zones, each chamber being heated by a burner 20. Air is admitted to each chamber 19 through openings 21 connected by pipes 22 with a supply pipe 23.

In the construction shown, the chimneys 15 are in pairs, and a shaft 24 extends through each pair of the chimneys and has mounted thereon in each chimney a damper 25. A bell crank 26 on the end of shaft 24 has one arm connected by an adjustable link 27 to an arm 28 on a thermostatic controlling device 29. The other arm of bell crank lever 26 is connected by an adjustable link 30 with arm 31 on a shaft 32 which carries dampers 33 in pipes 22. It will be seen that by this means the thermostatic controlling device 2 controls the outlet through chimneys 15 and the inlet through pipes 22 for each zone in accordance with the temperature of that zone.

In each chamber 19 adjacent the opening 1 where the heated gases are discharged from chamber 19 into the lehr, there is a thermostat controlling device 35 which operates an arm connected by an adjustable link 37 to an arm which controls valve 39 supplying fuel from pipe 40 to burner 20.

By this arrangement it will be seen that the thermostatic controlling device 29 will automatically provide for a sufficient supply of heated g; to furnish the necessary heat, while thermostat controlling device 35 automatically maintains a predetermined temperature the gases which enter the lehr for heating purposes.

In the cooling end of the chamber beneath the roof 41, there is a false roof 42 providing a heating space 43 into which air is admitted throu an opening 44. Ducts 45 at the sides of the lehr lead downward from space 43 to spaces 46 beneath the successive zones of the cooling end of the lehr from which spaces 46 the gases are distributed through openings 16 into the lehr. Also pipes 47 lead from pipe 23 into each chamber 46.

A thermostatic controlling device 50 in each cooling zone has an arm 51 connected by an adjustable link 52 with a bell crank lever 53 on the shaft 54 of dampers 55 in chimneys 18. The other arm of each bell crank lever 53 is connected by an adjustable link 56 with an arm 57 operating a damper 58. On the far side of the lehr, as viewed in Fig. 1a, there is an arm 59 on the shaft 54 connected by a link 60 with the arm 57 and damper 58 on that side of the lehr.

In each chamber 46 there is a thermostatic controlling device 61 which operates an arm 62 connected by an adjustable link 63 with an arm 64 on shaft 65 operating dampers 66 in pipes 47.

The various thermostatic controlling devices referred to above may be construed in any desirable manner and for purposes of illustration may be considered substantially the same. In Fig. 6, there is shown a detail of the thermostatic controlling device 50, which may be understood to be substantially the same as the other thermostatic controlling devices.

In this detail figure, it is shown that the device comprises a casing 70 within which there is a shaft 71. Between the shaft 71 and casing 70, there is a spiral member 72 attached to the shaft at one end by a screw 73 and attached at the other end to the casing by a screw 74. It will be seen that variations in temperature will insure the spiral member turning the shaft and thereby operating arm 51 connected to the shaft.

It will be seen that by thermostatic controlling devices 50 the amount of gas entering each zone is automatically controlled so as to maintain the predetermined temperature in that zone, while by thermostatic controlling device 61, the proportion of preheated air coming from space 43 to the air entering through pipes 47 is determined and thereby the temperature of the air entering through openings 16 is controlled. In this way proper cooling is effected without danger of introducing air cool enough to do any injury, while the proper amount of cooling air is insured to maintain each cooling zone at the desired temperature.

It will be readily understood that, in the operation of a lehr of this kind, there are frequent variations in the amount of glass introduced and such variations require changes in the amount of heating or cooling required, respectively. Unless there is some control of the heating and cooling means, such variations in the amount of glass entering the tunnel result in variations in temperature in the lehr so that the desired heating and cooling is not properly effected. Where the exterior of the lehr is subjected to varying conditions influencing the temperature thereof, similar necessity for varying the heating and cooling, respectively, is required in order to maintain constant conditions within the lehr.

If the control is merely by adjusting burners, it is evident that when there is a demand for the introduction of a relative large number of heat units into any particular zone, this is accompanied by an increase in the temperature of the gases which are employed to do the heating. This may easily result in excessive heating of certain portions of the ware. A chilling effect is produced in the cooling zones where the temperature of the entering cooling gases is not controlled.

While the invention has been described in connection with an entirely automatic control, it will be understood that in some circumstances, especially where the conditions under which the lehr is operated are relatively uniform, the results might be approximated by hand control of a part or all of the devices. Also it will be understood that various changes may be made in the arrangement of the controlling devices.

Fig. 5 is a somewhat diagrammatic view of a portion of the heating end of a lehr having a different arrangement for control. In this construction a lehr tunnel 75 is shown having a common duct 76 extending beneath a plurality of heating zones each having an inlet opening 77 from the duct into the lehr. Each inlet 77 is controlled by a damper 78 operated by hand or by a thermostatic controlling device 79. The heated gas is supplied to the duct from a chamber 80 and this in turn is heated by a burner 81, the valve 82 of which is automatically controlled by a thermostatic device 83. It will be understood that thermostatic device 83 controls valve 82 so that the temperature of the gases entering duct 76 remains substantially constant regardless of the amount of these gases that is drawn off through the respective openings 77. The temperature of each heating zone is controlled by the amount of the gases admitted from duct 76 to that zone. Of course, suitable stacks will be supplied for drawing off the gases and the stack or stacks may be thermostatically controlled or they may be controlled so as to maintain a substantially constant predetermined pressure in the lehr. It is preferable that the pressure in the lehr be slightly higher than that outside so that cold air will not enter cracks which may occur.

It will be understood that the temperature of the entering gases may be controlled by one thermostat, as indicated in Fig. 5, for as many zones as are of nearly enough the same temperature so that one temperature of entering gases is permissible in all. The total number of zones as well as the length of each zone and the number which may be supplied by gases at one temperature, are details which may be varied to suit the requirements of the annealing to be done.

While automatic control by thermostatic devices is preferred, it will be understood that similar results may be obtained by proper hand control of some or all of the burner and draft devices, especially where conditions are normally substantially constant over considerable periods of time. Also, while it is preferable to apply the invention to all zones of a lehr, it would be possible to apply it only to the zones where most danger of improper heating or cooling is encountered.

Having set forth the fundamental elements of this invention and certain details of one embodiment, it will be obvious to those skilled in the art how they may utilize this invention, within the scope of the appended claims.

What I claim is:

1. In a glass annealing lehr having a zone through which glass is moved and an inlet for temperature-controlling gases to said zone and into contact with the glass therein, two sources supplying gases to said inlet, said sources supplying gases at different temperatures, a thermostatic control device located in the current of gases adjacent said inlet, and means controlled by the thermostat for regulating the proportion of gases introduced from said sources and thereby controlling the temperature of the gases at the point where the thermostat is located.

2. In a glass annealing lehr having a zone through which glass is moved and an inlet for temperature-controlling gases to said zone and into contact with the glass therein, a thermostatic control device located in the current of gases adjacent said inlet and controlling the temperature of the gases at that point, and means to control the amount of gases introduced.

3. In a glass annealing lehr having a zone through which glass is moved and an inlet for temperature-controlling gases to said zone and into contact with the glass therein, a thermostatic control device located in the current of gases adjacent said inlet and controlling the temperature of the gases at that point, and thermostatic means located in said zone and controlling the amount of gases admitted to said zone and thereby maintaining its temperature substantially constant.

4. In glass annealing lehr having a plurality of zones through which glass is moved successively, an inlet for temperature controlling gases to each zone, and into contact with the glass therein, means automatically maintaining the gases admitted to a given zone at a substantially constant temperature, and automatic means governing the amount of gases admitted to a zone and thereby maintaining its temperature substantially constant.

5. In a glass annealing lehr having a heated zone and a cooled zone through which glass is moved successively, means for admitting heated gases to said heated zone and into contact with the glass therein, a burner to heat said gases, thermostatic means controlled by said heated gases and controlling said burner, means to control the amount of heated gases introduced into said zone, means to admit cooling gases to said cooling zone and into contact with the glass therein, and thermostatic means controlling the amount of said cooling gases admitted.

6. In a glass annealing lehr having a heated zone and a cooled zone through which glass is moved successively, means for admitting heated gases to said heated zone and into contact with the glass therein, a burner to heat said gases, thermostatic means controlled by said heated gases and controlling said burner, means to control the amount of heated gases introduced into said zone, means to admit cooling gases to said cooling zone and into contact with the glass therein, and thermostatic means controlling the amount of said cooling gases admitted, and separate thermostatic means controlling the temperature of said cooling gases.

7. In a glass annealing lehr having a heated zone and a cooled zone through which glass is moved successively, means to introduce gases into each zone and into contact with the glass therein, means thermostatically controlled by the admitted gases and maintaining substantially constant the temperature of said gases at the point of admission, and means thermostatically controlled by the temperature in the respective zones for regulating the quantity of gas introduced into each zone and thereby maintaining substantially constant the temperature of each zone.

8. A tunnel glass annealing lehr having successive annealing zones therein, means to move glass through said zones, means to admit gas into the entrance end of each zone and into contact with the glass therein, thermostatic means adjacent the point of admission of said gas, controlling its temperature and maintaining it substantially constant, and thermostatic means in said zone and adjacent the exit end thereof and controlling the amount of said gas admitted and thereby maintaining its temperature substantially constant at said exit.

WALTER O. AMSLER.